Dec. 10, 1957  TOSHIO YOSHIMURA  2,815,851
AUTOMATIC BELT STABILIZING CARRIER
Filed May 3, 1954  2 Sheets-Sheet 1

INVENTOR.
TOSHIO YOSHIMURA
BY

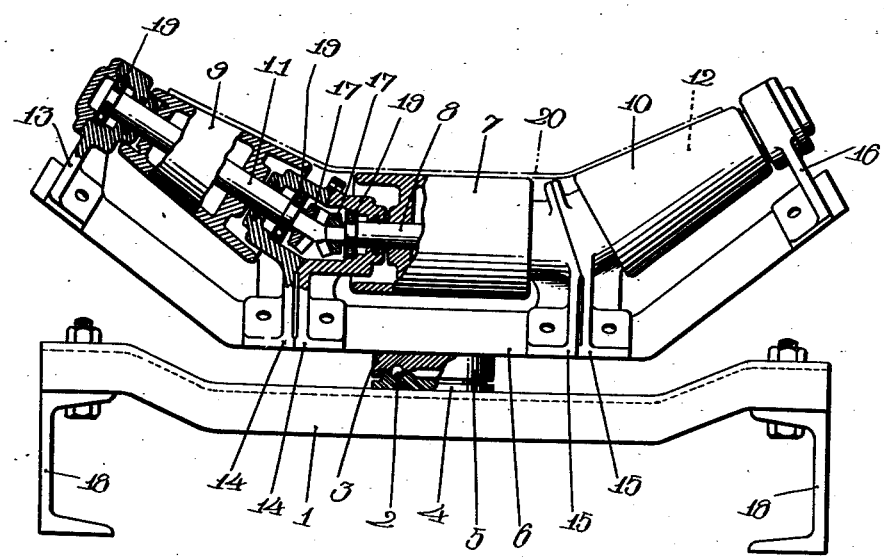

United States Patent Office 2,815,851
Patented Dec. 10, 1957

2,815,851
AUTOMATIC BELT STABILIZING CARRIER

Toshio Yoshimura, Noogata-shi, Japan

Application May 3, 1954, Serial No. 427,251

1 Claim. (Cl. 198—202)

The present invention relates to a self-stabilizing belt carrier for positioning a belt automatically.

It is an object of this invention to provide an automatic belt stabilizing carrier capable of preventing diversion or migration of the belt either to the right or to the left, the carrier responding to such diversion of the belt sensitively and accurately.

It is another object of this invention to provide an automatic belt stabilizing carrier capable of preventing diversion of the belt either to the right or to the left by picking up such diversion of the belt sensitively and accurately and with minimum resistance against the proceeding of the belt by freely turning a supporting arm as fully described below, thus ensuring smooth advance of the belt.

It is further an object of this invention to provide an automatic belt stabilizing carrier capable of preventing diversion of belt by picking up such diversion extremely sensitively through combined movement of a horizontal cylindrical roller and a pair of inclined taper rollers combined through a gearing member as hereinafter described.

With those and other objects in view and hereinafter set forth, the arrangement of parts is described in the ensuing specification and delineated in the claim appended hereto.

Figure 1:
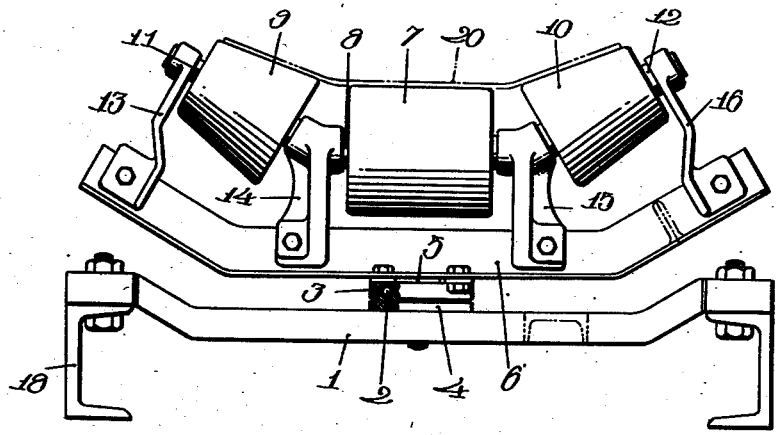
Figure 2:
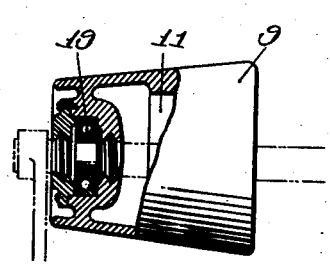
Figure 3:
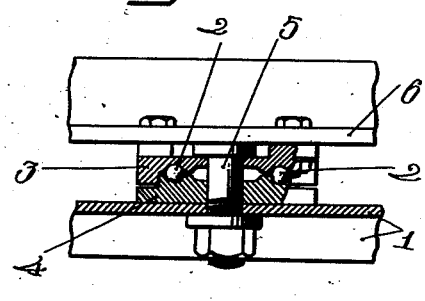

In the accompanying drawings, wherein illustrative embodiments of the invention are disclosed, Fig. 1 is a front view of an automatic belt stabilizing carrier, partly in section, constructed in accordance with the invention; Fig. 2 is a magnified front view of a taper roller, partly cut open, according to this invention; Fig. 3 is a magnified elevation of a vertical shaft, partly in section; Fig. 4 is a front view of the automatic belt stabilizing carrier of a modified construction, partly in section, embodying the invention; Fig. 5 is a magnified front view of a gearing member, partly in section, shown in Fig. 4 and Fig. 6 shows a side view of the construction shown in Fig. 5.

Referring in detail to the drawings, a shaft 5 having a vertically extending axis is provided on the centre of a supporting frame 1 with bearings 3, 4 having steel balls 2. At the top of the vertical shaft 5 there is fixed a supporting arm 6, both ends of which are bent upwardly, the supporting arm 6 carrying at its centre a cylindrical roller 7 fixed on a horizontal axle 8. At both ends of the supporting arm 6 there are provided frusto-conical or taper rollers 9, 10 of which diameter of outer ends is smaller in size than that of the inner ends. The frusto-conical rollers, of which the surface is composed of chilled cast iron, are fixed on inclined axles 11, 12, both the horizontal axle 8 and the inclined axles 11, 12 being pivoted on brackets 13, 14, 15, 16 fixed on the supporting arm 6. In Fig. 4, wherein a modified embodiment of this invention is shown, the horizontal axle 8 is connected with the inclined axles 11, 12 through gearing members 17, 17 so that all the axles rotate in unison. In addition, in the attached drawings, 18 is a supporting angle, 19 ball bearings of the rollers, and 20 the belt.

In the present invention, as the taper rollers 9, 10, of which the larger ends face the cylindrical roller 7, are fixed on the inclined axles 11, 12 on both ends of the supporting arm 6, friction resistance between the belt 20 and the taper rollers 9, 10 is the largest at the outer ends of the rollers and is the smallest at the inner and expanded ends of said rollers. Accordingly, due to the difference in the friction resistance of the taper rollers, the belt 20 is always pushed inwardly from both sides and inasmuch as the carrier is of symmetrical construction, a diversional or migratory movement towards the centre of the carrier is caused from both sides of the belt, thus keeping the belt 20 always in proper position. Moreover, as the supporting arm 6 is fixed at the top of the vertical shaft 5 through bearings 3, 4 having steel balls 2, the supporting arm 6 can be rotated freely. Therefore, when any force is added either on the right or the left side of the belt, the supporting arm 6 turns either to the right or the left direction accordingly and can reduce the resistance to advance of the belt 20, thus enabling the belt to proceed smoothly by preventing the diversion thereof and by minimizing the friction against the proceeding of the belt.

Furthermore, by connecting the horizontal axle 8 and the inclined axles 11, 12 through the gearing members 17, 17 so that all the axles move jointly as illustrated in Fig. 4, rotation of the taper rollers 9, 10 and that of the central cylindrical roller 7 are synchronized. Thus the carrier can sense diversion of the belt more quickly and more accurately so that stabilization will be effected rapidly and efficiently.

Having described two embodiments of my invention, it is obvious that the same is not to be restricted thereto, but is broad enough to cover all structures coming within the scope of the annexed claim.

Having thus described the invention, what is claimed as new and desired to be secured by Letters Patent, is:

A self-stabilizing belt carrier comprising a supporting frame, a transversely extending arm located over said supporting frame, means supporting said arm on said supporting frame for free turning movement about a substantially vertical axis, a substantially horizontal intermediate shaft turnably supported for rotation about its axis on said arm, a pair of elongated end shafts respectively located adjacent the opposite ends of said intermediate shaft and also carried for rotation about their axes, respectively, by said arm, said end shafts and said intermediate shaft all having their axes located in a common plane, and said end shafts being inclined upwardly away from said intermediate shaft and respectively having ends adjacent said intermediate shaft which are respectively lower than their ends distant from said intermediate shaft, a pair of gears fixed respectively to the ends of said intermediate shaft and a pair of gears fixed respectively to the ends of said end shafts respectively adjacent said intermediate shaft, said gears respectively fixed to said end shafts respectively meshing with said gears respectively fixed to the ends of said intermediate shaft, and all of said gears being of the same size so that all of said shafts rotate in unison at the same speed when any one of said shafts rotates, a cylindrical roller coaxially fixed to said intermediate shaft for rotation therewith, and a pair of tapered, frusto-conical rollers respectively fixed coaxially to said end shafts for rotation therewith, said frusto-conical rollers each having one end adjacent said cylindrical roller of a larger diameter than its opposite end distant from said cylindrical roller.

References Cited in the file of this patent

UNITED STATES PATENTS

| | | |
|---|---|---|
| 993,701 | Messiter | May 30, 1911 |
| 1,927,849 | Roberts | Sept. 26, 1933 |
| 2,109,923 | Lemmon | Mar. 1, 1938 |
| 2,551,840 | Johansen | May 8, 1951 |
| 2,570,364 | Mercier | Oct. 9, 1951 |